United States Patent [19]
Dupont

[11] 4,127,687
[45] Nov. 28, 1978

[54] PREVENTION OF FOULING OF MARINE STRUCTURES SUCH AS BOAT HULLS

[75] Inventor: John A. Dupont, Glenside, Pa.

[73] Assignee: Rohm and Haas Company, Philadelphia, Pa.

[21] Appl. No.: 706,726

[22] Filed: Jul. 19, 1976

[51] Int. Cl.$^2$ ............................................. C09D 5/16
[52] U.S. Cl. ..................................... 428/35; 428/907; 428/457; 106/15 R; 427/385 R; 424/270
[58] Field of Search ............... 427/142, 385 R, 388 C; 114/221, 222, 67 R; 106/15 R; 428/35, 907, 457

[56] References Cited

U.S. PATENT DOCUMENTS

| | | | |
|---|---|---|---|
| 3,069,336 | 12/1962 | Waite et al. | 114/67 R |
| 3,702,778 | 11/1972 | Mueller et al. | 114/67 R |
| 3,761,334 | 9/1973 | Zondek | 114/222 |
| 3,761,488 | 9/1973 | Lewis et al. | 260/293.68 X |
| 3,761,489 | 9/1973 | Grivas | 106/15 AF |
| 3,794,501 | 2/1974 | DeNio | 106/15 AF |
| 3,861,949 | 1/1975 | Onozuka et al. | 106/15 AF |
| 3,990,381 | 11/1976 | Shepherd et al. | 106/15 R |

Primary Examiner—Ralph S. Kendall

[57] ABSTRACT

A method of coating marine structures including marine vessel hulls is disclosed, the method comprising painting the surfaces of the structure to be exposed to fouling conditions in salt water including sea water and brackish water, with a paint containing certain 3-isothiazolones in an amount to control marine plant and animal life such as algae, hydroids, and barnacles.

40 Claims, No Drawings

PREVENTION OF FOULING OF MARINE STRUCTURES SUCH AS BOAT HULLS

This invention relates to the prevention and inhibition of fouling of marine structures such as marine vessels by organisms common in sea water. The marine structure is prepared by coating the surface thereof with a paint containing an organic binder and containing an effective amount of certain 3-isothiazolones. The isothiazolones are represented by the formula:

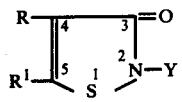

wherein Y is
(1) an unsubstituted alkyl group of one to 18 carbon atoms,
(2) a substituted alkyl group having at least one hydrogen atom replaced by hydroxy, halo, cyano, alkylamino, dialkylamino, phenylamino, halophenylamino, carboxy, carbalkoxy, alkoxy, aryloxy, morpholino, piperidino, pyrrolidonyl, carbamoxy, or isothiazolonyl, wherein the total number of carbon atoms in the substituted alkyl group does not exceed 18,
(3) an unsubstituted or halo-substituted alkenyl group of two to 18 carbon atoms,
(4) unsubstituted or halo-substituted alkynyl group of two to 18 carbon atoms,
(5) an unsubstituted or alkyl-substituted cycloalkyl group having a three to six carbon atom ring and up to 12 carbon atoms,
(6) an unsubstituted or a halo-, lower alkyl-, or lower alkoxy-substituted aralkyl group wherein the total number of carbon atoms in the aralkyl group does not exceed 10, or
(7) an unsubstituted or a phenoxy-, hydroxy-, trihalomethyl-, halo-, nitro-, lower alkyl-, or lower carbalkoxy-, substituted aryl group wherein the total number of carbon atoms in the aryl group does not exceed 10,
R is hydrogen, halogen, or a ($C_1$–$C_4$) alkyl group, and $R^1$ is hydrogen, halogen, or a ($C_1$–$C_4$) alkyl group, provided that at least one of R and $R^1$ is halogen, and the salts of
a compound of the above formula with a strong acid.

In compounds of the above formula, the radical Y is preferably selected from those in which the solubility is between about 0.5 and 400 ppm, more preferably between about 0.5 and 300 ppm, and still more preferably between about 0.5 and 100 ppm.

Representative Y substituents include methyl, ethyl, propyl, isopropyl, butyl, hexyl, octyl, decyl, pentadecyl, octadecyl, cyclopropyl, cyclohexyl, benzyl, 3,4-dichlorobenzyl, 4-methoxybenzyl, 4-chlorobenzyl, 3,4-dichlorophenyl, hydroxymethyl, chloromethyl, chloropropyl, diethylaminoethyl, cyanoethyl, carbomethoxyethyl, ethoxyethyl, 2-methoxy-1-bromomethyl, 3,3,5-trimethylcyclohexyl, phenoxyethyl, p-chloroanilinomethyl, phenylcarbamoxymethyl, allyl, propynyl, vinyl, carboxyethyl, 1-isothiazolonylethyl and 1,2,2-trichlorovinyl.

Representative R substituents include hydrogen, bromo, chloro, iodo, methyl, ethyl, propyl, isopropyl, butyl, and t-butyl.

Representative $R^1$ substituents are hydrogen, chloro, bromo, iodo, methyl, ethyl, propyl, isopropyl, butyl, t-butyl, chloromethyl, chloropropyl, bromomethyl, bromoethyl, and bromopropyl.

Typical compounds within the scope of the formula and methods of making them are disclosed in U.S. Pat. Nos. 3,523,121, 3,635,997, 3,749,788 and 3,761,488, the specifications of which are incorporated herein by reference. Patent No. 3,523,121 is the parent application of the application leading to U.S. Pat. No. 3,761,488, and the U.S. Pat. No. 3,523,121 patent is based on an application filed in the U.S. on Mar. 9, 1967, Ser. No. 621,780, the application (but not the invention) having been abandoned. Similar compounds are disclosed in U.S. Ser. No. 426,881 filed Dec. 20, 1973, now abandoned, (German Offenlegenshrift No. P/2,459,446, published Dec. 16, 1974). The U.S. Pat. Nos. 3,635,997 and 3,749,788 patents are to a different assignee from the other patents and applications, which are assigned to the assignee of the present application. The U.S. Pat. No. 3,635,997 patent is based on an application filed July 1, 1969 claiming priority in Switzerland on July 5, 1968. These patents disclose various 3-isothiazolones and substituted derivatives thereof. The U.S. Pat. No. 3,635,997 patent relates to the utilization of the compounds as germicides and fungicides, particularly in soaps, cosmetics, disinfectants, and preservatives. The U.S. Pat. Nos. 3,523,121 and 3,761,448 patents and application Ser. No. 621,780 relate to the utilization of similar 3-isothiazolones which may be substituted on the 4,5 carbon atoms and have varied substituents in the 2-position (the nitrogen atom). For example, the U.S. Pat. No. 3,523,488 patent discloses many of the compounds falling within the formula given above as biocidally active compounds including bactericidal, algacidal, fungicidal, slimicidal, and pesticidal agents. Among the pests which are controlled or destroyed are nematodes, mites, insects and so on. The compounds of the U.S. Pat. No. 3,761,488 patent are disclosed as being useful in aqueous media such as swimming pools, paper pulp systems, polymer dispersions, paints, particularly water based paints, water cooling systems, preservatives for fabric, leather, cosmetics, soaps and detergents, cutting oils, fuels, fiber finishes and so forth. As noted, among the uses for 3-isothiazolones mentioned in the U.S. Pat. No. 3,761,488 patent is the addition of the material to paints to prevent mildew or fungus growth, and the addition of the compounds to cooling tower water for the control of algae.

There are marked distinctions between the requirements for biocides in different environments, such as antifungal agents in house paints, fresh water algaecides, and antifouling agents for marine structures exposed to sea water flora and fauna. As is known, the mildew or fungus which grows on house paints and the like, utilizes the paint medium as a nutrient, or in some cases, the underlying substrate, such as wood, as the nutrient. The micelia and fruiting bodies of the fungi contact or penetrate the paint film and thus, through intimate contact with any fungicides in the film (to a large extent regardless of whether the fungicides are highly soluble, slightly soluble, or insoluble in water), the fungi are destroyed. In cooling towers utilizing fresh water, slime and algae may develop if effective compounds for combatting their growth are not present. In the case of cooling tower water, the compound should be highly soluble. In paints such as exterior house paints, undergoing normal exposure to weather, the solubility of the compound is not as critical since the paint film is only sporadically exposed to liquid water.

In the area of anti-fouling paints it has now been found that, within the broad classes of 3-isothiazolones including those disclosed in the patents noted above and in other publications, a relatively narrow group of compounds is useful for preventing fouling of marine structures such as boat, ship, or other vessel hulls, pilings, oil well drilling towers, and the like. This narrow class of compounds depends not only upon the utilization of certain substituents in the 4,5-position of the 3-isothiazolones and on the substituents in the 2-position on the nitrogen atom, but also involves a certain critical solubility of the compounds as determined by the UV method, hereinafter defined.

The results in anti-fouling paints when utilizing the 3-isothiazolones of the patents noted above, are not predictable from their effectiveness as general biocides, whether against fresh water algae, bacteria, fungi, insects, etc. As will be shown in the exemplification appearing hereinafter, of the many types of compounds suggested by the noted patents, relatively narrow classes of compounds are effective in combatting fouling organisms common in sea water and brackish water, the organisms including weeds (algae), slime, brown felt algae, hydroids, barnacles and the like. For instance, of three exemplary compounds of the U.S. Pat. No. 3,635,997 patent mentioned in column 5, line 45, and items 4 and 8 in Table 1 of that column, only the compound 4,5-dichloro-2(4'-chlorophenyl)-3-isothiazolone was effective in anti-fouling environments, while the other two were not effective.

Of the compounds appearing hereinafter in the examples, a number are common to Table 1 appearing in columns 9-12 of the U.S. Pat. No. 3,573,488 patent. Among the compounds common to the latter patent and the present specification are the compounds identified in the patent as example numbers 3, 5-8, 13, 23, 24, 33, 36, 37, the n-octyl isomer of examples 38, 40, 75, 76, 79, 84, and 93-96. Of these, only examples 8, 13, 33, 40, 79 and 93 were active or effective sea water marine antifoulants.

In example B of the U.S. Pat. No. 3,573,448 patent (appearing in columns 22-24) involving the control of algae, bacteria, fungi, and slime in fresh water cooling towers, not one of the compounds, or in some cases its homologue or analog, was effective as a salt water marine anti-foulant. Thus, 2-n-hexyl-3-isothiazolone, 2-n-octyl-3-isothiazolone, 4-chloro-2-methyl-3-isothiazolone, 2-t-octyl-3-isothiazolone, the octyl and the dodecyl homologues of 2-n-decyl-3-isothiazolone, and 2-benzyl-3-isothiazolone, in amounts ranging from about 2.5 parts per million to 500 parts per million in cooling tower water treatment were not active for controlling sea water marine organisms which contribute to underwater fouling of marine structures. The 4,5-dichloro-2-methyl-3-isothiazolone of the U.S. Pat. No. 3,573,488 patent (column 23, lines 69-71) was not tested but the 2-n-butyl and 2-n-hexyl homologues were utilized in the present invention and were found to control or inhibit the growth of one or more sea water marine organisms considered to be causes of fouling of such underwater surfaces. Thus, in effect, only one out of six compounds disclosed in the U.S. Pat. No. 3,573,488 patent as effective for controlling slime, algae, etc. in cooling water towers has been found to be effective as an anti-fouling agent in salt water marine environments.

Concerning paint film mildewcides appearing in example C of column 24 of the U.S. Pat. No. 3,573,488 patent, of the seven compounds common to that example and to the present application, only one was found to be effective as an anti-foulant. Thus, 2-n-butyl-3-isothiazolone and the hexyl, octyl, decyl, and benzyl analogues and homologues thereof were ineffective as anti-foulants as was the 5-chloro-2-methyl-3-isothiazolone. Of the compounds common to the U.S. Pat. No. 3,573,488 patent and the present application, only 5-chloro-2-benzyl-3-isothiazolone was effective in both environments. Both oil based paints and water based paints were utilized in the U.S. Pat. No. 3,573,488 patent and thus it appears that the paint is not particularly critical.

From the foregoing, it is apparent that the effectiveness of biocidal materials useful in combatting fungi, insects, bacteria, and the like in non-aqueous media, and biocides effective in combatting fungi, slime, and algae in fresh water systems, cannot be used to predict the effectiveness of these compounds as anti-fouling agents in sea water and brackish water capable of supporting marine life such as barnacles, slime, hydroids, "grassy" brown felt algae and the like.

Among the differences between the compounds of the present invention and those of which are ineffective as antifoulants, it has been discovered that at least one of the constituents R and $R^1$ (substituents on the 4 and 5 position of the 3-isothiazolone) must be halogen, and preferably is chlorine. Another critical factor is that the isothiazolone derivative must not be highly soluble in aqueous systems but it must be soluble to the extent of between about 0.5 and 500 ppm. Apparently, if the material is highly soluble it is leached out of the anti-fouling paint or coating film in a short period of time and cannot exert its influence over the months required in normal usage. On the other hand, if the material is totally insoluble, it cannot leach to the surface of the paint film to combat the development of the fouling organisms.

The anti-fouling compounds of the present invention can be used in combination with conventional anti-fouling compounds such as bis(trialkyltin) sulfides, tri-n-butyltin laurate, tri-n-butyltin chloride, cuprous oxide, triethyl tin chloride, tri-n-butyl(2-phenyl-4-chlorophenoxy)tin, tributyltin oxide, molybdenum disulfide, antimony oxide, polymeric n-butyltitanate, tri-n-butyltin fluoride, cuprous ethylene bis-dithiocarbamate, copper naphthenate, 2-(N,N-dimethylthiocarbamoylthio)-5-nitrothiazyl, tetrabutyldistannoxane-1,3-dioctanoate, tetrabutyldistannoxane-1,3-dioctanoate, tributyl-tin halide, and the like.

Any conventional binder may be utilized in the marine anti-fouling paint incorporating the anti-foulant of the invention. Examples of trade-recognized binders are polyvinyl chloride in a solvent based system, chlorinated rubber in a solvent based system, acrylic resins in solvent based or aqueous systems, vinyl chloride-vinyl acetate copolymer systems as aqueous dispersions or solvent based systems, butadiene-styrene rubbers, butadiene-acrylonitrile rubbers, butadiene-styrene-acrylonitrile rubbers, drying oils such as linseed oil, asphalt, epoxies, and the like. The paints commonly contain inorganic pigments, organic pigments or dyes insoluble in sea water, and may contain materials such as rosin to provide controlled release of the anti-foulant, rosin being to a very slight extent soluble in sea water. The paints may contain plasticizers, rheology characteristic modifiers and other conventional ingredients.

In the following examples, two systems of testing the compounds and evaluating the same are utilized. One involves the utilization of a confined amount of the materials to be evaluated in a cylindrical container having an open end covered by a membrane permeable to a limited extent by the sea water and by the compound in the container. The other method involves making up an anti-fouling paint and testing the same. In a four month period, meaningful results are obtained, and for a full scale test, a six month period, bracketing the summer months, is preferred. The evaluations involving (1) field tests, (2) laboratory tests, and (3) paint panel tests, are as follows:

| 1). FIELD TESTS: - Membrane Diffusion Raft Trials |  |  |
|---|---|---|
| A specially constructed raft provides three types of conditions which are similar to those found on a ship: - |  |  |
| a). | Waterline | Well illuminated, aerated surface conditions favoring plant settlement and growth. |
| b). | Flats | Poorly illuminated deeper sited conditions favoring animal settlement and growth. |
| c). | Turn-of-Bilge | Conditions intermediate between the above allowing both plant and animal settlement to occur. |

A known quantity of the test compound is placed into a cylindrical plastic container whose open end is then covered with a membrane of known porosity; the complete unit is attached to the appropriate raft panel so that the poison can freely diffuse into the free water layer around it. Regular inspections, recording time and quantity of settlement, allow a life history of each membrane trial to be constructed. Each raft panel contains 35 compounds to be evaluated together with 4 standard poisons and 1 non-toxic membrane for control.

The behavior on the raft can thus be compared with that of the standard poisons and the non-toxic control. At normal loading a membrane over the standard poisons would be free from macro-fouling after six months immersion. Compounds showing selective effects against restricted groups of fouling organisms also show up by membrane testing.

After the completion of membrane tests the contents of all containers are checked visually for poison loss. An empty container indicates an unacceptably high solubility for long term effectiveness; where the poison loss is low the compound is tested in one of two ways depending on its performance against fouling.

1. No apparent activity — a check against Enteromorpha spores in a simple drop test.
2. Some activity against fouling — Full laboratory testing as detailed below.

(2) LABORATORY TESTS

Standard laboratory toxicity tests use *Enteromorpha* spores (zoospores or gametes) but *Ectocarpus* spores and barnacle nauplii may also be used. During the spore tests additional information on the control of bacterial and diatom slimes becomes available since these organisms are unavoidably introduced with the spore inoculum.

More detailed laboratory toxicity tests on promising compounds determine $LD_{50}$ values as percentage saturated solution.

(3) PAINT FORMULATION AND TEST PANEL OR PLAQUE TESTS

In order to evaluate the compound under practical conditions, weighed quantities of promising compounds are ground in standard volumes of a selected range of paint media and brushed out on plaques for marine immersion.

In the membrane tests, the results of approximately 140 compounds evaluated appear in Table 1. The symbols "0" means no detactable effect, the symbol "+" indicates the compound is active against the given fouling organism, and the symbol "++" means that the compound appears to be effective over at least about a four month period for essentially preventing fouling activity by the given organism. In the Table, "weed" designates a grass-like algal growth common in sea water.

Table 1 is as follows:

TABLE 1

Anti-fouling Potential of Isothiazolones

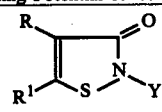

| Example No. | R | R$^1$ | Y | Weed Control[a] | Barnacle Control[a] | Contents at the end of test[b] | Lab Bioassay[c] LD$_{50}$ | Solubility by UV method |
|---|---|---|---|---|---|---|---|---|
| 1 | H | H | —C$_4$H$_9$-n | 0 | 0 | 0 | — | — |
| 2 | H | H | —C$_6$H$_{13}$-n | 0 | 0 | 0 | — | 5100 |
| 3 | H | H | —C$_8$H$_{17}$-n | 0 | 0 | 0 | — | 481 |
| 4 | H | H | —C$_8$H$_{17}$-t | 0 | 0 | 0 | — | 410 |
| 5 | H | H | —C$_{12}$H$_{25}$-n | 0 | 0 | + | — | — |
| 6 | H | H | —C$_{12}$H$_{25}$-t | 0 | 0 | + | — | — |
| 7 | H | H | —C$_{14}$H$_{29}$-n | 0 | 0 | ++ | 0.1 | — |
| 8 | H | H | —C$_{18}$H$_{37}$-n | 0 | 0 | ++ | — | — |
| 9 | H | H | —CH$_2$CH$_2$—⟨⟩—Cl | 0 | 0 | 0 | — | — |
| 10 | H | H | —CH$_2$—⟨⟩ | 0 | 0 | 0 | — | 3000 |

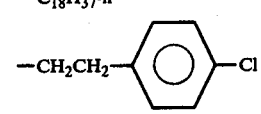

TABLE 1-continued
Anti-fouling Potential of Isothiazolones

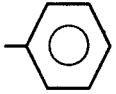

| Example No. | R | R¹ | Y | Weed Control[a] | Barnacle Control[a] | Contents at the end of test[b] | Lab Bioassay[c] $LD_{50}$ | Solubility by UV method |
|---|---|---|---|---|---|---|---|---|
| 11 | H | H | phenyl | 0 | 0 | 0 | — | — |
| 12 | H | H | 4-Cl-phenyl | + | + | + | — | 180 |
| 13 | H | Cl | H (Zn—Salt) | + | 0 | 0 | — | — |
| 14 | H | Cl | —CH₃(CaCl₂— complex) | 0 | 0 | 0 | — | — |
| 15 | H | Cl | —C₆H₁₃-n | 0 | 0 | 0 | — | 900 |
| 16 | Cl | Cl | —C₈H₁₇-n[d] | + + | + + | 0 | — | 66 |
| 17 | H | Cl | —CH₂CHC₄H₉-n \| Et | + + | + + | 0 | .013 | 135 |
| 18 | H | Cl | —CH(CH₂)₅CH₃ \| CH₃ | 0/0 | + +[f] / + + | —[e] / [h][g] | — | 175 |
| 19 | H | Cl | —CH(CH₂)₃CH(CH₃)₂ \| CH₃ | 0/0 | 0/0 | [g]/[h] | — | 190 |
| 20 | H | Cl | —CHCH₂CHCH₂CH₃ \| \| Et CH₃ | 0/0 | + +[f] / 0 | —[e] / [h][g] | — | 300 |
| 21 | H | Cl | —C₈H₁₇-t | 0/0 | + +[f] / 0 | —[e] / [h][g] | — | 200 |
| 22 | H | Cl | —C₁₀H₂₁-n[d] | + + | + + | 0 | — | 7.2 |
| 23 | H | Cl | —C₁₂H₂₅-n | + + | + | + | 0.02 | 0.7–1.5 |
| 24 | H | Cl | —C₁₄H₂₉-n | 0 | + + | + + | — | — |
| 25 | H | Cl | —C₁₆H₃₃-n | 0 | 0 | + + | — | — |
| 26 | H | Cl | —C₁₈H₃₇-n | 0 | 0 | + + | 1.0 | — |
| 27 | H | Cl | cyclohexyl | 0 | + | + | — | 217 |
| 28 | H | Cl | dimethylcyclohexyl | 0/0 | + +[f] / 0 | —[e] / [h][g] | — | 185 |
| 29 | H | Cl | —CH₂CH₂-phenyl | + + | 0 | 0 | — | 240 |
| 30 | H | Cl | —CH(CH₃)-phenyl | 0/0 | + +[f] / 0 | —[e] / [h][g] | — | 420 |
| 31 | H | Cl | —CH₂-phenyl | + +/+ | + +[f] / + + | + +[g] / [h] | — | 390 |
| 32 | H | Cl | —CH₂-phenyl-Cl[d] | + + | + | + + | 0.018 | 70 |
| 33 | H | Cl | phenyl[d] | + + | + | + | — | 180 |

TABLE 1-continued

Anti-fouling Potential of Isothiazolones

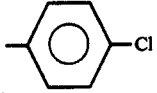

| Example No. | R | R[1] | Y | Weed Control[a] | Barnacle Control[a] | Contents at the end of test[b] | Lab Bioassay[c] LD$_{50}$ | Solubility by UV method |
|---|---|---|---|---|---|---|---|---|
| 34 | H | Cl | 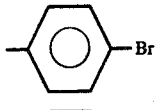 | + + | + + | + + | 0.025 | 41 |
| 35 | H | Cl |  | + + | 0 | + + | 0.22 | — |
| 36 | H | Cl |  | + + | 0 | + + | 0.08 | — |
| 37 | H | Cl | 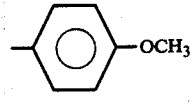 | + | + | + + | — | — |
| 38 | H | Cl | 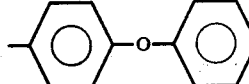 | + + | + | + + | 0.025 | 300 |
| 39 | H | Cl | 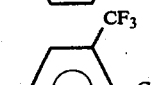 | 0 | + + | + + | 0.6 | — |
| 40 | H | Cl | 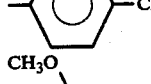 | + | 0 | + + | — | — |
| 41 | H | Cl | 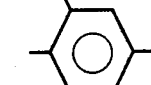 [d] | + + | + | + + | 0.03 | 55 |
| 42 | H | Cl | 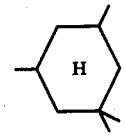 [d] | + + | + | + + | 0.03 | 45 |
| 43 | Cl | H | —C$_8$H$_{17}$-n | + + | 0 | + | 0.0003 | 60 |
| 44 | Cl | H | —C$_8$H$_{17}$-t | 0/0 | + +[f]/0 | g/+h | — | — |
| 45 | Cl | H | 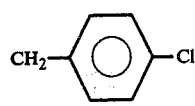 | 0/0 | + +[f]/0 | + +g/h | — | — |
| 46 | Cl | H | 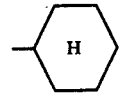 | + | 0 | + + | — | — |
| 47 | Br | H | —C$_6$H$_{13}$-n | 0 | + + | + | >1 | — |
| 48 | Br | H | —C$_8$H$_{17}$-n | 0 | 0 | + | — | 45 |
| 49 | Br | H | —C$_{10}$H$_{21}$-n | + + | 0 | + | 0.01 | — |
| 50 | Br | H | —C$_{12}$H$_{25}$-n | 0 | + | + + | — | — |
| 51 | Br | H | 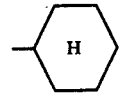 | + + | + | + | 0.01 | 143.0 |

TABLE 1-continued

Anti-fouling Potential of Isothiazolones $$\underset{R^1}{\overset{R}{\diagdown}}\underset{S}{\diagup}\underset{N}{\diagdown}Y \quad (C=O)$$

| Example No. | R | $R^1$ | Y | Weed Control[a] | Barnacle Control[a] | Contents at the end of test[b] | Lab Bioassay[c] $LD_{50}$ | Solubility by UV method |
|---|---|---|---|---|---|---|---|---|
| 52 | Br | H | $-CH_2CH_2-C_6H_5$ | 0 | 0 | + | — | — |
| 53 | Br | H | $-CH_2-C_6H_4-Cl$ | ++ | + | ++ | 0.1 | 18.0 |
| 54 | Br | H | $-C_6H_4-Cl$ | 0 | 0 | ++ | — | — |
| 55 | Cl | Cl | $-C_4H_9$-n | ++ | + | + | — | 1000 |
| 56 | Cl | Cl | $-C_6H_{13}$-n[d] | ++ | ++ | 0 | — | 115 |
| 57 | Cl | Cl | $-C_8H_{17}$-n[d] | ++ | ++ | ++ | 0.001 | 2.3 |
| 58 | Cl | Cl | $-CH_2-CH(Et)-C_4H_9$-n | ++ | ++ | + | 0.0024 | 30.0 |
| 59 | Cl | Cl | $-C_8H_{17}$-t | ++ | + | ++ | 0.006 | 38.0 |
| 60 | Cl | Cl | $-CH(CH_2)_5CH_3$ with $CH_3$ | ++/+ | ++[f]/++ | —[e]/ [g][h] | — | 50.0 |
| 61 | Cl | Cl | $-CH(CH_2)_3CH(CH_3)_2$[d] with $CH_3$ | ++/++ | ++[f]/++ | —[e]/ [g][h] | — | 55.0 |
| 62 | Cl | Cl | $-CHCH_2CHCH_2CH_3$[d] with Et, $CH_3$ | 0/0 | ++/0 | —[e]/ [g][h] | — | 85.0 |
| 63 | Cl | Cl | $-C_{10}H_{21}$-n | ++ | 0 | ++ | 0.03 | 1.4 |
| 64 | Cl | Cl | $-C_{12}H_{25}$-n | 0 | + | ++ | — | 0.1–3 |
| 65 | Cl | Cl | $-C_{14}H_{29}$-n | 0 | 0 | ++ | — | 0.9 |
| 66 | Cl | Cl | $-C_6H_{33}$-n | 0 | 0 | ++ | — | 0.5 |
| 67 | Cl | Cl | cyclohexyl[d] | ++ | ++ | + | 0.3 | 48 |
| 68 | Cl | Cl | 3,3,5-trimethylcyclohexyl | 0/0 | +[f]/++ | ++[g]/++[h] | — | 45 |
| 69 | Cl | Cl | $-CH_2CH_2-C_6H_5$ | ++ | 0 | ++ | 0.01 | 22 |
| 70 | Cl | Cl | $-CH(CH_3)-C_6H_5$ | ++/+ | ++/++ | —[g]/0[h] | — | 50 |
| 71 | Cl | Cl | $-CH_2-C_6H_5$[d] | ++ | ++ | + | 0.25 | 52 |
| 72 | Cl | Cl | $-CH_2-C_6H_4-Cl$[d] | ++ | + | ++ | 0.015 | 11 |
| 73 | Cl | Cl | $-CH_2-C_6H_3(Cl)_2$ | 0/0 | ++/0 | +[g]/ [h] | — | — |

TABLE 1-continued

Anti-fouling Potential of Isothiazolones $$\underset{R^1}{\overset{R}{\underset{S}{\bigvee}}}\overset{O}{\underset{N-Y}{\parallel}}$$

| Example No. | R | $R^1$ | Y | Weed Control[a] | Barnacle Control[a] | Contents at the end of test[b] | Lab Bioassay[c] $LD_{50}$ | Solubility by UV method |
|---|---|---|---|---|---|---|---|---|
| 74 | Cl | Cl | –C$_6$H$_5$ [d] | + + | + + | + + | 0.03 | 8 |
| 75 | Cl | Cl | –C$_6$H$_4$–Cl | + + | 0 | + + | 0.006 | 3 |
| 76 | Cl | Cl | –C$_6$H$_4$–Cl | + | 0 | + + | — | — |
| 77 | Cl | Cl | –C$_6$H$_3$Cl$_2$ | 0 | 0 | + + | — | — |
| 78 | Cl | Cl | –C$_6$H$_3$(CH$_3$)(Cl) | + + | 0 | + | 0.08 | 3.7 |
| 79 | Cl | Cl | –C$_6$H$_3$(OCH$_3$)(Cl) [d] | + + | + | + + | 0.065 | −3 rapidly decomposes |
| 80 | Cl | Cl | –C$_6$H$_4$–OCH$_3$ [d] | + + | + | + + | 0.016 | −5 rapidly decomposes |
| 81 | Cl | Cl | –C$_6$H$_3$(Cl)(CH$_3$) | 0 | 0 | + + | — | — |
| 82 | Cl | Cl | –C$_6$H$_4$–NO$_2$ | 0 | 0 | + + | — | — |
| 83 | Cl | Cl | –C$_6$H$_4$–C$_4$H$_9$-n | 0 | + | + + | — | — |
| 84 | Cl | Cl | –C(O)–C$_7$H$_{15}$-n | 0/0 | 0/0 | + +  g/h | — | — |
| 85 | Cl | Cl | –C(O)–CH$_2$–C$_6$H$_5$ | 0/0 | + +[f] / 0 | + g/h | — | — |
| 86 | Br | Cl | –C$_4$H$_9$-n | + + | 0 | 0 | — | 1170 |
| 87 | Br | Cl | –C$_6$H$_{13}$-n | + + | + + | 0 | — | 85 |
| 88 | Br | Cl | –C$_8$H$_{17}$-n [d] | + + | + + | + | — | 2.6 |
| 89 | Br | Cl | –C$_{10}$H$_{21}$-n | 0 | 0 | + + | — | — |

TABLE 1-continued

Anti-fouling Potential of Isothiazolones

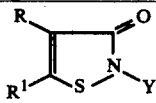

| Example No. | R | R¹ | Y | Weed Control[a] | Barnacle Control[a] | Contents at the end of test[b] | Lab Bioassay[c] LD$_{50}$ | Solubility by UV method |
|---|---|---|---|---|---|---|---|---|
| 90 | Br | Cl | —⟨H⟩ | ++ / + | ++[f] / ++ | ∓ [g] / [h] | — | 45 |
| 91 | Br | Cl | —CH$_2$—⟨⟩—Cl | ++ | 0 | + | 0.02 | 3.3 |
| 92 | Br | Cl | —CH$_2$CH$_2$—⟨⟩—Cl | 0 | 0 | + | — | — |
| 93 | Br | Cl | —⟨⟩—Cl[d] | ++ | ++ | ++ | 0.012 | 1.72 |
| 94 | Br | Br | —CH$_3$ | + | 0 | 0 | — | — |
| 95 | Br | Br | —C$_8$H$_{17}$-n | ++ | 0 | 0 | — | 1.7 |
| 96 | Br | Br | —C$_{10}$H$_{21}$-n | 0 | 0 | ++ | — | — |
| 97 | Br | Br | —C$_{12}$H$_{25}$-n | 0 | 0 | ++ | — | — |
| 98 | Br | Br | —⟨H⟩ | ++ | 0 | + | 0.02 | 6.4 |
| 99 | Br | Br | —CH$_2$—⟨⟩—Cl | ++ | + | ++ | 0.01 | 1.7 |
| 100 | CH$_3$ | Cl | —CH$_3$ | 0 | 0 | 0 | — | — |
| 101 | CH$_3$ | Cl | —C$_8$H$_{17}$-n | ++ | ++ | 0 | — | 38 |
| 102 | CH$_3$ | Br | —C$_8$H$_{17}$-n | + | + | 0 | — | — |
| 103 | CH$_3$ | Cl | —CH$_2$CHC$_4$H$_9$-n ∣ Et | ++ / 0 | ++[f] / ++ | ∓ [g] / e [h] | — | 102 |
| 104 | CH$_3$ | Cl | —C$_{10}$H$_{21}$-n | ++ / 0 | ++[f] / 0 | ∓ [g] / e [h] | — | — |
| 105 | CH$_3$ | Cl | —C$_{12}$H$_{25}$-n | 0 | + | ++ | — | — |
| 106 | CH$_3$ | Cl | —C$_{14}$H$_{29}$-n | 0 | 0 | ++ | — | — |
| 107 | CH$_3$ | Cl | —⟨H⟩ | 0 | + | + | — | 350 |
| 108 | CH$_3$ | Cl | —CH$_2$—CH$_2$—⟨⟩ | 0 | ++ | + | >1 | 155 |
| 109 | CH$_3$ | Cl | —CH$_2$—⟨⟩ | ++ | + | 0] | — | 100 |
| 110 | CH$_3$ | Cl | —CH$_2$—⟨⟩—Cl[d] | + | + | ++ | — | 34 |
| 111 | CH$_3$ | Cl | —⟨⟩ | ++ | + | + | — | 200 |
| 112 | CH$_3$ | Cl | Cl—⟨⟩ | ++ / + | ++ / 0 | ∓ [g] / + [h] | — | 23 |

TABLE 1-continued
Anti-fouling Potential of Isothiazolones $$\underset{R^1}{\overset{R}{\diagdown}}\!\!\underset{S}{\diagup}\!\!\underset{N}{\diagdown}\!\!\underset{Y}{\diagup}\!\!\overset{O}{=}$$

| Example No. | R | R[1] | Y | Weed Control[a] | Barnacle Control[a] | Contents at the end of test[b] | Lab Bioassay[c] LD$_{50}$ | Solubility by UV method |
|---|---|---|---|---|---|---|---|---|
| 113 | CH$_3$ | Cl | –C$_6$H$_4$–Cl | + + | + | + + | 0.013 | 13 |
| 114 | CH$_3$ | Cl | –C$_6$H$_4$–Cl[d] | + + | + + | + + | 0.008 | 14 |
| 115 | CH$_3$ | Cl | –C$_6$H$_4$–F[d] | $\frac{++}{++}$ | $\frac{++^f}{++}$ | $\frac{++}{}\frac{g}{h}$ | — | 35 |
| 116 | CH$_3$ | Cl | –C$_6$H$_4$–Br | $\frac{++}{0}$ | $\frac{++^f}{++}$ | $\frac{+}{}\frac{g}{h}$ | — | 7 |
| 117 | CH$_3$ | Cl | –C$_6$H$_4$–I | + | + + | + + | 0.2 | — |
| 118 | CH$_3$ | Cl | –C$_6$H$_4$(CH$_3$) (o-) | + + | 0 | + | 0.15 | — |
| 119 | CH$_3$ | Cl | –C$_6$H$_4$–CH$_3$[d] (m-) | + + | 0 | + + | 0.1 | — |
| 120 | CH$_3$ | Cl | –C$_6$H$_4$–CH$_3$ (p-) | $\frac{++}{+}$ | $\frac{++^f}{++}$ | $\frac{+}{}\frac{g}{h}$ | — | 60 |
| 121 | CH$_3$ | Cl | –C$_6$H$_4$–Bu-n[d] | + + | + + | e | 0.13 | — |
| 122 | CH$_3$ | Cl | –C$_6$H$_3$(CH$_3$)$_2$ | + + | + + | + + | 0.01 | — |
| 123 | CH$_3$ | Cl | –C$_6$H$_4$–OCH$_3$ | $\frac{++}{+}$ | $\frac{++^f}{++}$ | $\frac{+}{}\frac{g}{h}$ | — | — |
| 124 | CH$_3$ | Cl | –C$_6$H$_4$–O–C$_6$H$_5$ | 0 | 0 | + + | — | — |
| 125 | CH$_3$ | Cl | –C$_6$H$_4$–OH[d] | + + | 0 | + + | >1 | — |
| 126 | CH$_3$ | Cl | –C$_6$H$_4$–CO$_2$Et[d] | + | + + | + + | 0.13 | — |

TABLE 1-continued

Anti-fouling Potential of Isothiazolones $$\underset{R^1}{\overset{R}{\fbox{}}}\underset{S}{\overset{O}{\underset{N-Y}{\parallel}}}$$

| Example No. | R | $R^1$ | Y | Weed Control[a] | Barnacle Control[a] | Contents at the end of test[b] | Lab Bioassay[c] $LD_{50}$ | Solubility by UV method |
|---|---|---|---|---|---|---|---|---|
| 127 | $CH_3$ | Cl | 4-$NO_2$-phenyl | $\frac{0}{0}$ | $\frac{0}{0}$ | $\frac{-}{+}\frac{g}{h}$ | — | — |
| 128 | $CH_3$ | Cl | 2-$F_3C$-phenyl[d] | + + | 0 | + | 0.6 | — |
| 129 | $CH_3$ | Cl | 3-$CF_3$-phenyl | $\frac{++}{0}$ | $\frac{++^f}{0}$ | $\frac{-}{+}\frac{g}{h}$ | — | 12 |
| 130 | $CH_3$ | Cl | 4-$CF_3$-phenyl | $\frac{0}{0}$ | $\frac{++^f}{++}$ | $\frac{-}{+}\frac{g}{h}$ | — | 7 |
| 131 | $CH_3$ | Cl | 3-$CF_3$-4-Cl-phenyl | 0 | 0 | + + | — | — |
| 132 | $CH_3$ | Cl | 2-$H_3C$-4-Cl-phenyl | $\frac{++}{+}$ | $\frac{++^f}{0}$ | $\frac{-}{+}\frac{g}{h}$ | — | — |
| 133 | $CH_3$ | Cl | 2-$CH_3$-4-Br-phenyl | 0 | 0 | + + | — | — |
| 134 | $CH_3$ | Cl | 3,4-di-Cl-phenyl | 0 | 0 | + + | — | 3.5 |
| 135 | $CH_3$ | Cl | 2,4-di-Cl-phenyl | $\frac{0}{+}$ | $\frac{+^f}{0}$ | $++\frac{g}{h}$ | — | 4 |
| 136 | $CH_3$ | Cl | 2,5-di-Cl-phenyl | $\frac{0}{0}$ | $\frac{+^f}{0}$ | $\frac{-}{++}\frac{g}{h}$ | — | 3 |
| 137 | $CH_3$ | H | 2,3-di-Cl-phenyl | $\frac{0}{0}$ | $\frac{+^f}{0}$ | $\frac{-}{0}\frac{g}{h}$ | — | — |
| 138 | $CH_3$ | H | 2-Cl-phenyl | + | 0 | + + | — | — |

TABLE 1-continued
Anti-fouling Potential of Isothiazolones $$\begin{array}{c} R \\ R^1 \end{array} \begin{array}{c} O \\ \parallel \\ N-Y \\ S \end{array}$$

| Example No. | R | R¹ | Y | Weed Control[a] | Barnacle Control[a] | Contents at the end of test[b] | Lab Bioassay[c] LD$_{50}$ | Solubility by UV method |
|---|---|---|---|---|---|---|---|---|
| 139 | CH$_3$ | H | 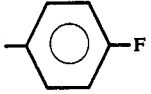 4-F-phenyl | 0/0 | +  +[f]/0 | 0  g/h | — | — |
| 140 | CH$_3$ | H | 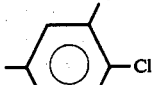 3,4-dichlorophenyl | 0 | 0 | + + | — | — |
| 141 | CH$_3$ | H | 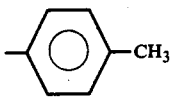 4-CH$_3$-phenyl | 0/0 | +  +[f]/0 | 0  g/h | — | — |
| 142 | CH$_3$ | H | 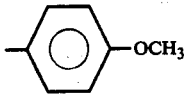 4-OCH$_3$-phenyl | 0/0 | 0/0 | 0  g/h | — | — |

Membrane Test results are of an average 15 to 16 weeks of immersion, unless stated otherwise.
[a] 0 = none, + = some, + + = effective.
[b] Amount of toxicants remaining in the test container after the completion of the membrane diffusion raft tests: 0 = empty or trace, + = some, + + = ample.
[c] Using Enteromorpha spores.
[d] Effective against Hydroids.
[e] Liquids - content was difficult to judge.
[f] The 1975 Spring settlement of barnacles was very meager and the results given could only be based on presence or absence in the circumstances.
[g] After 32 weeks of immersion.
[h] After 43 weeks immersion.

EXAMPLES 143–151

The anti-fouling paint formulations used is exemplified by the following:

| Component | Parts By Weight |
|---|---|
| Binder in the form of a conventional vinyl chloride-vinyl acetate copolymer | 6.1 |
| Wood rosin | 4.1 |
| Tricresyl phosphate | 2.1 |
| Anti-foulant compound to be evaluated | 2.8 |
| Cuprous oxide | 48.6 |
| Iron oxide pigment | 3.6 |
| Flow control agent, as hydrous magnesium silicate sold as "Bentone" | 1.0 |
| Xylene | 15.8 |
| Methyl isoamyl ketone | 15.9 |

The most preferred specific compounds were utilized in paints including vinyl chloride-vinyl acetate copolymers, chlorinated rubber, acrylic emulsions, and conventional paints with or without rosin to contain 20% by weight of biocide in the wet film and in some cases (Example 144 and Example 145) with concentrations of 5, 10, and 15% based on the wet film. Each of the compounds is also described in the membrane tests noted above. The paints were applied at normal thicknesses to plaques or panels of 10 centimeters by 10 centimeters which were immersed in various positions as described for the raft noted above. The compounds and results, as against weed, in the season April to November, 1975, are as follows:

TABLE 2

| | Compound | | | Effectiveness in Given Paint | | | | | |
|---|---|---|---|---|---|---|---|---|---|
| Example | R | R' | Y | V | V/R | CR | CR/R | EM | CONV |
| 143 | Cl | H | n-C$_8$—H$_{17}$ | h | h | — | — | — | — |
| 144 | Cl | Cl | n-C$_8$—H$_{17}$ | h | h | h | — | h | m |
| 145 | Cl | Cl | 4'chlorophenyl | h | h | h | — | h | h |
| 146 | Cl | Cl | 2-phenylethyl | h | h | h | h | p | h |
| 147 | CH$_3$ | Cl | 4'chlorophenyl | h | h | h | h | m | p |
| 148 | Cl | Cl | benzyl | h | h | h | h | p | p |
| 149 | Cl | Cl | 4'chlorobenzyl | l | h | p | h | h | h |
| 150 | Cl | Cl | phenyl | m | h | p | h | p | p |

TABLE 2-continued

| | Compound | | | Effectiveness in Given Paint | | | | | |
|---|---|---|---|---|---|---|---|---|---|
| Example | R | R' | Y | V | V/R | CR | CR/R | EM | CONV |
| 151 | Cl | Cl | n-C$_{10}$H$_{21}$ | m | m | p | p | m | l |

V = polyvinyl chloride-acetate
CONV = conventional anti-fouling formulation
V/R = vinyl/rosin
h = high performance
CR = chlorinated rubber
m = medium performance
CR/R = chlorinated rubber/rosin
l = low performance
EM = acrylic emulsion
p = poor or unacceptable performance In the foregoing examples, it is apparent that the evaluations for barnacles and similar animal life are not as reliable as the evaluations for weed, no doubt due in part to the utilization of small panels or small membranes and due also to the fact that in one of the seasons involved, the incidence of new populations of barnacles was abnormally low.

The water solubilities of several isothiazolones were determined by UV spectrophotometric measurements of saturated aqueous solution of each compound in comparison with measurement of solutions of carefully prepared known concentration as outlined in the following example.

DETERMINATION OF SOLUBILITY OF 5-CHLORO-2-(4-FLUOROPHENYL)-4-METHYL-3-ISOTHIAZOLONE OF EXAMPLE 115

A sample of 5-chloro-2-(4-fluorophenyl)-4-methyl-3-isothiazolone (0.0406 g., $1.67 \times 10^{-4}$ mole) was dissolved in 50 ml. of methanol. A 5 ml. aliquot of the solution was diluted to 1000 ml. with deionized water, providing a solution of $1.67 \times 10^{-5}$ moles/liter concentration. An ultraviolet spectrum of this solution was run using a 10 cm. cell. The absorbance (As) at the wave length of maximum absorption (279 nm.) was 1.208. The molar absorptivity, AM, was calculated from the relationship $$AM = (As/bc)$$

where $b$ and $c$ are path length or cell thickness and concentration respectively. Thus, AM was $$\frac{12.08 \times 10^{-1}}{10 \times 1.67 \times 10^{-5}} \text{ or } 7234.$$

Another sample of the compound (0.3–0.5 g.) was stirred vigorously in 40 ml. of deionized water for approximately 72 hrs. to give a saturated solution. The mixture was filtered through very fine filter paper (Whatman No. 50) to remove all suspended solid. Small portions of the filtrate were diluted with water by various factors until an approximately mid-scale absorbance was obtained upon running an ultraviolet spectrum. Such an absorbance was obtained at a dilution of 10. The absorbance was 0.975 in a 10 cm. cell. Using the value for AM obtained earlier, in the equation $$C = (As/Am^b),$$

the concentration was found to be $$\frac{9.75 \times 10^{-1}}{7.234 \times 10^3 \times 10} \text{ or}$$

$1.35 \times 10^{-5}$ mole/liter. Multiplying by the dilution factor (10), the concentration of the saturated solution was $1.35 \times 10^{-4}$ moles/liter. Multiplying by the molecular weight (243.5) a concentration of $3.28 \times 10^{-2}$ g./liter or 33 ppm. was calculated to be the solubility of this compound.

I claim:

1. A method for controlling fouling by barnacles, hydroids, and algae of an underwater surface of a marine structure in salt water comprising the steps of applying a coating of an organic paint to said surface, said paint containing an effective amount of a compound of the formula:

wherein Y is
(1) an unsubstituted alkyl group of one to 18 carbon atoms,
(2) a substituted alkyl group having at least one hydrogen atom replaced by hydroxy, halo, cyano, alkylamino, dialkylamino, phenylamino, halophenylamino, carboxy, carbalkoxy, alkoxy, aryloxy, morpholino, piperidino, pyrrolidonyl, carbamoxy, or isothiazolonyl, wherein the total number of carbon atoms in the substituted alkyl group does not exceed 18,
(3) an unsubstituted or halo-substituted alkenyl group of two to 18 carbon atoms,
(4) unsubstituted or halo-substituted alkynyl group of two to 18 carbon atoms,
(5) an unsubstituted or alkyl-substituted cycloalkyl group having a three to six carbon atom ring and up to 12 carbon atoms,
(6) an unsubstituted or a halo-, lower alkyl-, or lower alkoxy-substituted aralkyl group wherein the total number of carbon atoms in the aralkyl group does not exceed 10, or,
(7) an unsubstituted or a phenoxy-, hydroxy-, trihalo-, methyl-, halo-, nitro-, lower alkyl-, or lower carbalkoxy-, substituted aryl group wherein the total number of carbon atoms in the aryl group does not exceed 10, R is hydrogen, halogen, or a ($C_1$–$C_4$) alkyl group, and $R^1$ is hydrogen, halogen, or a ($C_1$–$C_4$) alkyl group, provided that at least one of R and $R^1$ is halogen, and the salts of a compound of the above formula with a strong acid, and further provided that when one of R and $R^1$ is other than halogen, the solubility of the compound as determined by the UV method is between about 0.5 and 500 ppm, and exposing the painted surface to fouling conditions in salt water.

2. The method of claim 1 in which the solubility of said compound is between about 0.5 and 400 ppm, and at least one of R and R¹ is halogen.

3. A method for controlling fouling by barnacles, hydroids, and algae of an underwater surface of a marine structure in salt water comprising the steps of applying a coating of an organic paint to said surface, said paint containing an effective amount of a compound of the formula:

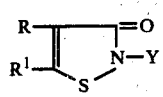

wherein Y is
(1) an unsubstituted alkyl group of one to 18 carbon atoms,
(2) a substituted alkyl group having at least one hydrogen atom replaced by hydroxy, halo, cyano, alkylamino, dialkyl amino, phenylamino, halophenylamino, carboxy, carbalkoxy, alkoxy, aryloxy, morpholino, piperidino, pyrrolidonyl, carbamoxy, or isothiazolonyl, wherein the total number of carbon atoms in the substituted alkyl group does not exceed 18.
(3) an unsubstituted or halo-substituted alkenyl group of two to 18 carbon atoms,
(4) unsubstituted or halo-substituted alkynyl group of two to 18 carbon atoms,
(5) an unsubstituted or alkyl-substituted cycloalkyl group having a three to six carbon atom ring and up to 12 carbon atoms,
(6) an unsubstituted or a halo-, lower alkyl-, or lower alkoxy-substituted aralkyl group wherein the total number of carbon atoms in the aralkyl group does not exceed 10, or,
(7) an unsubstituted or a phenoxy-, hydroxy-, trihalomethyl-, halo-, nitro-, lower alkyl-, or lower carbalkoxy-, substituted aryl group wherein the total number of carbon atoms in the aryl group does not exceed 10,
R is hydrogen, halogen, or a ($C_1$-$C_4$) alkyl group, and R¹ is hydrogen, halogen, or a ($C_1$-$C_4$) alkyl group, provided that at least one of R and R¹ is halogen, and the salts of a compound of the above formula with a strong acid, and further provided that the solubility of the compound is between about 0.5 and 300 ppm, and at least one of R and R¹ is halogen, and exposing the painted surface to fouling conditions in salt water.

4. The method of claim 3 in which the solubility of said compound is between about 0.5 and 100 ppm, and at least one of R and R¹ is chlorine.

5. A marine structure prepared as set forth in claim 1.
6. A marine structure prepared as set forth in claim 2.
7. A marine structure prepared as set forth in claim 3.
8. A marine structure prepared as in claim 4.
9. The method of claim 1 in which Y is selected from the following, the numerals in parenthesis corresponding to those of claim 1:
(1) wherein said unsubstituted alkyl group has 4 to 10 carbon atoms,
(5) wherein the unsubstituted or substituted cycloalkyl group is cyclohexyl,
(6) wherein the aryl portion of the aralkyl group is phenyl and the halo-, alkyl-, or alkoxy- group when present on the phenyl group is chlorine, methyl, or methoxy,
(7) wherein the substituent if any, is carbalkoxy having 1 or 2 carbon atoms, halo, ($C_1$-$C_4$) alkyl, trifluoromethyl, methoxy, methyl, hydroxyl, or phenoxy, and the aryl group is phenyl.

10. The method of claim 9 in which the solubility of said compound is between about 0.5 and 400 ppm.
11. The method of claim 9 in which the solubility of said compound is between about 0.5 and 300 ppm.
12. The method of claim 9 in which the solubility of said compound is between about 0.5 and 100 ppm.

13. A method for controlling fouling by barnacles, hydroids, and algae of an underwater surface of a marine structure in salt water, comprising the steps of applying a coating of an organic paint to said surface, and curing said paint, said paint containing an effective amount of at least one compound of the formula:

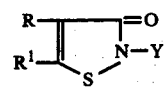

wherein R and R¹ are hydrogen, bromine, chlorine, or a ($C_1$-$C_4$) alkyl group, at least one of R and R¹ being halogen, and
(1) when R is hydrogen and R¹ is chlorine, Y is
(a) a straight chain or branched chain alkyl having from 8 to 14 carbon atoms, the two terminal carbon atoms having the configuration —CH$_2$—CH$_3$,

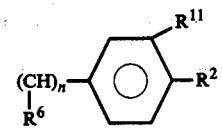

wherein $n$ is 0 or 1, $R^6$ is hydrogen or methyl, and when $R^{11}$ is hydrogen, $R^2$ is ($C_1$-$C_4$) alkoxy, halogen or phenoxy, or $R^2$ and $R^{11}$ are chlorine when $n$ is 0,

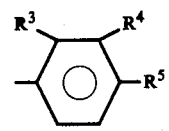

wherein $R^3$ is a ($C_1$-$C_4$) alkoxy and one of $R^4$ and $R^5$ is hydrogen and the other is chlorine,
(d) cyclohexyl or methyl substituted cyclohexyl, or

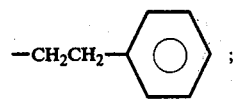

(2) when R and R¹ are chlorine, Y is
(a) ($C_4$-$C_{10}$) straight chain or branched chain alkyl,
(b) cyclohexyl or methyl substituted cyclohexyl,

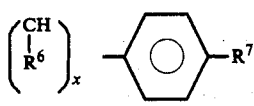 c)

wherein x is from 0 to 2, $R^6$ is H or ($C_1$–$C_4$) alkyl, and $R^7$ is hydrogen or is chlorine,

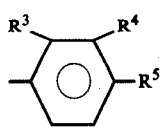 d)

wherein $R^3$ is a ($C_1$–$C_4$) alkoxy or ($C_1$–$C_4$) alkyl, and one of $R^4$ and $R^5$ is hydrogen and the other is chlorine, or

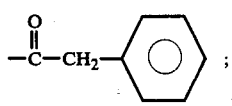 e)

(3) when R is bromine and $R^1$ is chlorine, Y is
(a) ($C_4$–$C_8$) normal alkyl,
(b) cyclohexyl or methyl substituted cyclohexyl, or

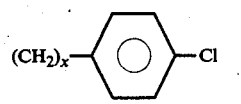 c)

wherein x is 0 or 1;
(4) when R is ($C_1$–$C_4$) alkyl and $R^1$ is chlorine, Y is
(a) ($C_8$–$C_{10}$) alkyl,

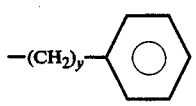 b)

wherein Y is from 0 to 2,

 c)

wherein $R^8$ is halogen, $CF_3$ or ($C_1$–$C_4$) alkyl,

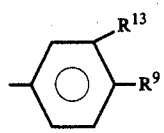 d)

wherein $R^9$ is ($C_1$–$C_4$) alkyl, methoxy, hydroxy, or

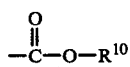

in which $R^{10}$ is methyl or ethyl, when $R^{13}$ is H, or $R^{13}$ is ($C_1$–$C_4$) alkyl when $R^9$ is alkyl

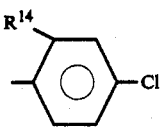 e)

wherein $R^{14}$ is Cl or $CH_3$

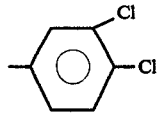 f)

(5) when R is chlorine and $R^1$ is hydrogen, Y is cyclohexyl, —$C_8$—$H_{17}$, or

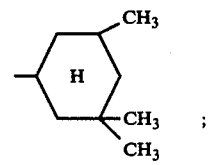 ;

(6) when R and $R^1$ are bromine, Y is ($C_8$) alkyl or cyclohexyl;
and exposing the painted surface to fouling conditions in salt water.

14. A marine structure ship hull prepared by the method of claim 13.

15. The method of claim 13 in which the compound is selected from those in which
(1) when R is hydrogen and $R^1$ is chlorine, Y is;
(a) as in claim 13
(b) as in claim 13 in which $R^{11}$ is hydrogen, and $R^2$ is hydrogen, chlorine, or phenoxy, or
(c) as in claim 13, of the formula
(2) when R and $R^1$ are chlorine, Y is
(a) as in claim 13,
(b) as in claim 13 in which the radical is cyclohexyl or is of the formula

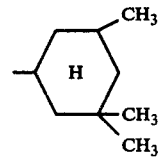

(c) as in claim 13 in which $R^6$ is hydrogen or $CH_3$ and $R^7$ is hydrogen, or
(d) as in claim 13;
(3) when R is bromine and $R^1$ is chlorine, Y is
(a) as in claim 13,
(b) as in claim 13 as cyclohexyl or the radical

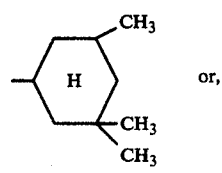 or, (c) as in claim 13;
(4) when R is methyl and $R^1$ is chlorine, Y is (a) ($C_8$–$C_{10}$) alkyl in which the terminal carbon atoms have the configuration —$CH_2$—$CH_3$ (b) as in claim 13 wherein $y$ is 2

(c) as in claim 13 wherein $R^8$ is chlorine, or when $R^8$ is bromine, iodine, or fluorine, represented by $R^{12}$, the radical has the formula

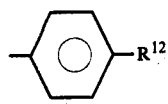

(d) as in claim 13 wherein $C^{13}$ is H, or is methyl when $C^9$ is methyl, or (e) as in claim 13.

16. The method of claim 13 in which the compound is selected from (1) when R is hydrogen and $R^1$ is chlorine, Y is (a) ($C_8$–$C_{10}$) normal alkyl;

(2) when R and $R^1$ are chlorine, Y is (a) ($C_6$–$C_8$) alkyl, (b) cyclohexyl,

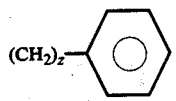

wherein $z$ is 1 or 2; and (3) when R is methyl or bromine and $R^1$ is chlorine, Y is (a) normal octyl b)

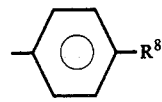

wherein $R^8$ is chlorine or fluorine.

17. The method of claim 3 in which said compound is 4,5-dichloro-2-cyclohexyl-3-isothiazolone.
18. The method of claim 3 in which said compound is 4,5-dichloro-2-n-hexyl-3-isothiazolone.
19. The method of claim 3 in which said compound is 4,5-dichloro-2-n-octyl-3-isothiazolone.
20. The method of claim 3 in which said compound is 4,5-dichloro-2-n-decyl-3-isothiazolone.
21. The method of claim 3 in which the compound is 4,5-dichloro-2-(4'-chlorophenyl)-3-isothiazolone.
22. The method of claim 3 in which the compound is 4,5-dichloro-2-benzyl-3-isothiazolone.
23. The method of claim 3 in which the compound is 4,5-dichloro-2-(4'-chlorobenzyl)-3-isothiazolone.
24. The method of claim 3 in which the compound is 4-chloro-2-n-octyl-3-isothiazolone.
25. The method of claim 3 in which the compound is 4-methyl-5-chloro-2-(4'-chlorophenyl)-3-isothiazolone.
26. The method of claim 3 in which the compound is 5-chloro-2-(4'-chlorobenzyl)-3-isothiazolone.
27. The method of claim 3 in which the compound is 5-chloro-2-(2-phenylethyl)-3-isothiazolone.
28. The method of claim 3 in which the compound is 4,5-dichloro-2-(2-phenylethyl)-3-isothiazolone.
29. A marine structure prepared as in claim 17.
30. A marine structure prepared as in claim 18.
31. A marine structure prepared as in claim 19.
32. A marine structure prepared as in claim 20.
33. A marine structure prepared as in claim 21.
34. A marine structure prepared as in claim 22.
35. A marine structure prepared as in claim 23.
36. A marine structure prepared as in claim 24.
37. A marine structure prepared as in claim 25.
38. A marine structure prepared as in claim 26.
39. A marine structure prepared as in claim 27.
40. A marine structure prepared as in claim 28.

* * * * *

UNITED STATES PATENT AND TRADEMARK OFFICE
CERTIFICATE OF CORRECTION

PATENT NO. : 4,127,687
DATED : November 28, 1978
INVENTOR(S) : John A. Dupont

Page 1 of 10

It is certified that error appears in the above-identified patent and that said Letters Patent are hereby corrected as shown below.

Correct claims 13, 15 and 16 to read as follows:

13. A method for controlling fouling by barnacles, hydroids, and algae of an underwater surface of a marine structure in salt water, comprising the steps of applying a coating of an organic paint to said surface, and curing said paint, said paint containing an effective amount of at least one compound of the formula:

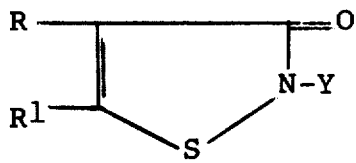

wherein $R$ and $R^1$ are hydrogen, bromine, chlorine, or a $(C_1-C_4)$ alkyl group, at least one of $R$ and $R^1$ being halogen, and (1) when $R$ is hydrogen and $R^1$ is chlorine, $Y$ is (a) a straight chain or branched chain alkyl having from 8 to 14 carbon atoms, the two terminal carbon atoms having the configuration $-CH_2-CH_3$, (b)

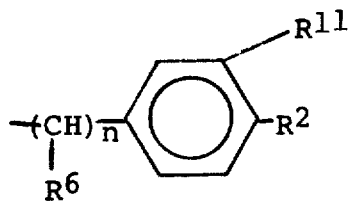

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

wherein n is 0 or 1, $R^6$ is hydrogen or methyl, and when $R^{11}$ is hydrogen, $R^2$ is $(C_1-C_4)$ alkoxy, halogen or phenoxy, or $R^2$ and $R^{11}$ are chlorine when n is 0, (c) 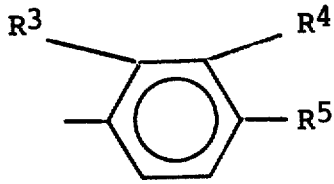

wherein $R^3$ is a $(C_1-C_4)$ alkoxy and one of $R^4$ and $R^5$ is hydrogen and the other is chlorine, (d) cyclohexyl or methyl substituted cyclohexyl, or (e)  ;

(2) when R and $R^1$ are chlorine, Y is (a) $(C_4-C_{10})$ straight chain or branched chain alkyl, (b) cyclohexyl or methyl substituted cyclohexyl,

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

(c) 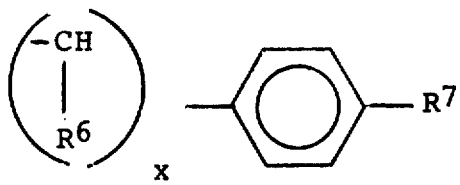

wherein x is from 0 to 2, $R^6$ is H or $(C_1-C_4)$ alkyl, and $R^7$ is hydrogen or is chlorine, (d) 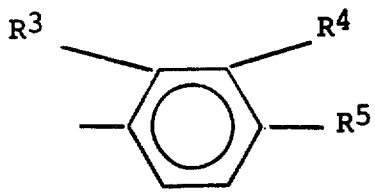

wherein $R^3$ is a $(C_1-C_4)$ alkoxy or $(C_1-C_4)$ alkyl, and one of $R^4$ and $R^5$ is hydrogen and the other is chlorine, or (e) 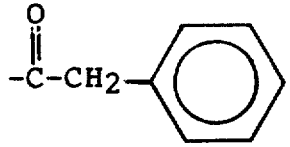

;

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above—identified patent and that said Letters Patent are hereby corrected as shown below:

(3) when R is bromine and $R^1$ is chlorine, Y is (a)    $(C_4-C_8)$ normal alkyl, (b)    cyclohexyl or methyl substituted cyclohexyl, or (c)

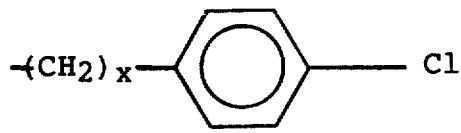

wherein x is 0 or 1;

(4) when R is $(C_1-C_4)$ alkyl and $R^1$ is chlorine, Y is (a)    $(C_8-C_{10})$ alkyl, (b)

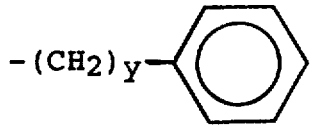

wherein Y is from 0 to 2, (c)

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

wherein $R^8$ is halogen, $CF_3$ or $(C_1-C_4)$ alkyl, (d) 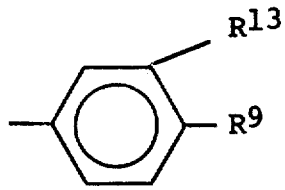

wherein $R^9$ is $(C_1-C_4)$ alkyl, methoxy, hydroxy, or

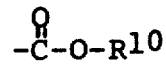

in which $R^{10}$ is methyl or ethyl, when $R^{13}$ is H, or $R^{13}$ is $(C_1-C_4)$ alkyl when $R^9$ is alkyl, (e) 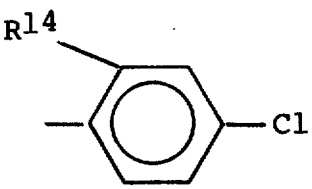

wherein $R^{14}$ is Cl or $CH_3$, or

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

(f) 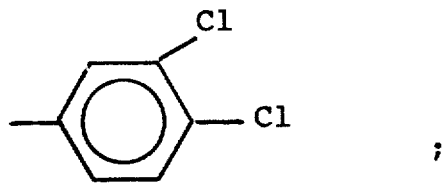 ;

(5) when R is chlorine and $R^1$ is hydrogen, Y is cyclohexyl, $-C_8-H_{17}$, or

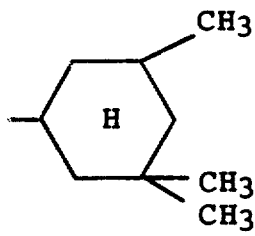

(6) when R and $R^1$ are bromine, Y is ($C_8$) alkyl or cyclohexyl;

and exposing the painted surface to fouling conditions in salt water.

15. The method of claim 13 in which the compound is selected from those in which (1) when R is hydrogen and $R^1$ is chlorine, Y is;

(a) as in claim 13, (b) as in claim 13 in which $R^{11}$ is hydrogen, and $R^2$ is hydrogen, chlorine, or phenoxy, or

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

(c)    as in claim 13, (2)    when R and $R^1$ are chlorine, Y is (a)    as in claim 13, (b)    as in claim 13 in which the radical is cyclohexyl or is of the formula

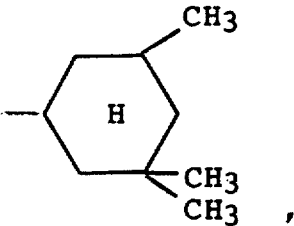

(c)    as in claim 13 in which $R^6$ is hydrogen or $CH_3$ and $R^7$ is hydrogen, or (d)    as in claim 13;

(3)    when R is bromine and $R^1$ is chlorine, Y is (a)    as in claim 13, (b)    as in claim 13 as cyclohexyl or the radical

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

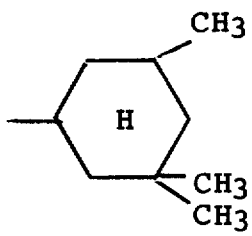, or (c)    as in claim 13;

(4)    when R is methyl and $R^1$ is chlorine, Y is (a)    $(C_8-C_{10})$ alkyl in which the terminal carbon atoms have the configuration $-CH_2-CH_3$, (b)    as in claim 13 wherein y is 2, (c)    as in claim 13 wherein $R^8$ is chlorine, or when $R^8$ is bromine, iodine, or fluorine, represented by $R^{12}$, the radical Y has the formula

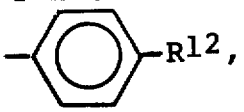

(d)    as in claim 13 wherein $C^{13}$ is H, or is methyl when $C^9$ is methyl, or

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

(e)     as in claim 13.

16. The method of claim 13 in which the compound is selected from (1)     when R is hydrogen and $R^1$ is chlorine, Y is (a)     $(C_8-C_{10})$ normal alkyl;

(2)     when R and $R^1$ are chlorine, Y is (a)     $(C_6-C_8)$ alkyl, (b)     cyclohexyl,

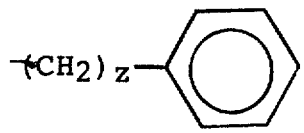

wherein z is 1 or 2; and (3)     when R is methyl or bromine and $R^1$ is chlorine, Y is (a) normal octyl, or

UNITED STATES PATENT AND TRADEMARK OFFICE
CERTIFICATE OF CORRECTION

PATENT NO. : 4,127,687
DATED : November 28, 1978
INVENTOR(S) : John A. Dupont

It is certified that error appears in the above-identified patent and that said Letters Patent are hereby corrected as shown below:

(b) 

wherein $R^8$ is chlorine or fluorine.

Signed and Sealed this

First Day of April 1980

[SEAL]

Attest:

SIDNEY A. DIAMOND

Attesting Officer

Commissioner of Patents and Trademarks